United States Patent [19]

Bittenson et al.

[11] Patent Number: 4,977,573
[45] Date of Patent: Dec. 11, 1990

[54] EXCIMER LASER OUTPUT CONTROL DEVICE

[75] Inventors: Steven N. Bittenson, Bedford; Gary K. Klauminzer, Lexington, both of Mass.

[73] Assignee: Questek, Inc., Billerica, Mass.

[21] Appl. No.: 321,631

[22] Filed: Mar. 9, 1989

[51] Int. Cl.$^5$ .............................................. H01S 3/097
[52] U.S. Cl. ..................................... 372/81; 372/58; 372/69; 372/33; 372/57
[58] Field of Search ..................... 372/58, 59, 55, 29, 372/9, 57, 81, 33

[56] References Cited

U.S. PATENT DOCUMENTS

| | | | |
|---|---|---|---|
| 4,429,392 | 1/1984 | Yoshida et al. | 372/58 |
| 4,630,273 | 12/1986 | Inoue et al. | 372/9 |
| 4,661,958 | 4/1987 | Bowes et al. | 372/59 |
| 4,674,099 | 6/1987 | Turner | 372/59 |
| 4,722,090 | 1/1988 | Haruta et al. | 372/59 |
| 4,794,613 | 12/1988 | Nilsen et al. | 372/29 |
| 4,803,693 | 2/1989 | Schramm | 372/59 |

Primary Examiner—Léon Scott, Jr.
Attorney, Agent, or Firm—Nutter, McClennen & Fish

[57] ABSTRACT

An excimer laser including a discharge chamber containing a mixture of halogen, rare gas and buffer gas uses two gas sources to replenish the halogen in the discharge chamber while maintaining the concentrations of all the gases at the optimum levels. One of the gas sources, source A, contains a mixture of the rare gas and the buffer gas in optimum concentrations. The other gas source, source B, contains both the rare gas and the buffer gas, in optimum relative concentrations, and also the halogen, in a concentration which is greater than optimum. As the laser operates and the gain of the laser decreases due to halogen depletion, gas from source B is injected into the discharge chamber to raise the halogen concentration. Gas is then released from the chamber to reduce the chamber pressure to the original level. When halogen replenishment does not suffice to restore the laser gain, due to the build-up of contaminants in the chamber, a portion of chamber gas is released and it is replenished with fresh gas from both sources in proportions adequate to provide optimum concentrations of the various gases.

10 Claims, 3 Drawing Sheets

EXCIMER LASER OUTPUT CONTROL DEVICE

FIELD OF INVENTION

The invention is related to the field of excimer lasers and more particularly to controlling the output power of the lasers by maintaining optimum gas mixtures used in the excimer lasers.

BACKGROUND OF THE INVENTION

Excimer lasers, also known as rare gas halide lasers, use a mixture of gases in a discharge chamber, excited by an external electrical power source, to produce a laser beam. A typical gas mixture is composed of (i) approximately 0.2 percent halogen; (ii) approximately 1 to 2 percent rare gas; and (iii) the balance a buffer gas such as helium, neon or a mixture thereof. The various gases are injected into the discharge chamber in the proper ratios, and the chamber is then sealed.

The gain, and thus the output of the laser, is directly related to the concentrations of the different gases in the chamber gas mixture and to the purity of the mixture. The gain is particularly sensitive to the concentrations of the halogen and the rare gas. When the laser is operating, the halogen reacts with other materials in the discharge chamber, and the halogen is thereby depleted, thus reducing the gain of the laser. The reactions in the chamber also produce gaseous and particulate contaminants which can further reduce the laser gain.

A prior approach to the problem of halogen depletion is to compensate by controlling the excitation power applied to the laser. A feedback control system maintains the laser gain at a desired level by controlling the excitation power. Thus when the laser gain begins to fall as the halogen is depleted and contaminants are formed, the control system increases the excitation power. In this way, the gain of the laser is stabilized at the desired level. This system is described in U.S. Pat. No. 4,611,270 to Klauminzer et al., entitled "Method and Means of Controlling the Output of a Pulsed Laser".

Excitation control effectively stabilizes the gain of the laser within a predetermined, and somewhat limited, dynamic range. Eventually, however, halogen depletion reaches a point where the gain cannot be maintained by further increasing the excitation power.

Another control arrangement restores the gain of the laser by injecting additional halogen into the discharge chamber. However, since the amount of additional halogen required is quite small, the halogen is typically pre-mixed with the buffer gas and this mixture is then injected into the chamber. The inspection thus not only raises the concentration of the halogen in the discharge chamber, it also raises the concentration of the buffer gas, which is not depleted during laser operation.

In order to maintain optimum total chamber pressure following the gas injection, a portion of the chamber gas can be removed. However, removing the gas from the chamber causes the amount of rare gas in the chamber mixture to be reduced below the optimum value, and thus, the gain is reduced.

A further method used to maintain adequate concentrations of the various gases in the discharge chamber is to store a mixture of all the gases, in the optimum proportions, and then use this mixture to replace a portion of the gas in the chamber. Thus when the concentration of the halogen in the chamber is depleted, a portion of the gas in the chamber is released and pre-mixed gas is injected into the chamber to recharge it. The problem with this method is that a relatively large amount of gas must be replaced to appropriately raise the halogen level, since the halogen is only a small portion (0.2%) of the pre-mixed gas.

A modification of this method, currently in use, employs two gas sources - one container providing a mixture of all three gases and the other a mixture of the halogen and the buffer gas. The halogen-buffer source is used to replenish the halogen, and the three-gas mixture is used to replace contaminated gas released from the chamber. Eventually, the chamber mixture departs materially from the optimum concentrations, resulting in lower gain.

SUMMARY OF INVENTION

In accordance with the invention, two gas sources are used to replenish the halogen in the discharge chamber and maintain the concentrations of all the gases at the optimum levels. One of the gas sources, source A, contains a mixture of the rare gas and the buffer gas in optimum concentrations. The other gas source, source B, contains both the rare gas and the buffer gas, in optimum relative concentrations, and also the halogen, in a concentration which is greater than optimum.

To begin laser operation, the discharge chamber is filled using a combination of gas from both sources such that the chamber contains the optimum concentration of halogen. This ensures that the other gases will be at optimum concentrations, also. Thereafter, when the gain of the laser decreases due to halogen depletion, gas from source B is injected into the discharge chamber to raise the halogen concentration.

Ultimately, because of the accumulation of contaminants in the chamber, halogen replenishment will not suffice to restore the laser gain adequately. Therefore, a portion of the gas, which is then a mixture of halogen, buffer gas, rare gas and contaminants, is released from the chamber and the chamber is replenished with fresh gas from both sources in proportions adequate to provide optimum concentrations of the various gases. If desired, the released gas can be recycled, for example, by filtering it to remove the contaminants and the halogen. The filtered gas can then be fed into gas source A and re-used, thus significantly reducing the cost of operating the laser.

In the preferred embodiment of the invention, the gain of the laser is stabilized by using the two gas sources, A and B, in combination with the excitation power control system disclosed in the commonly-assigned U.S. Pat. No. 4,611,270 to Klauminzer et al., discussed above. Continuous control of the excitation power supplied to the laser gas chamber maintains the gain of the laser within a pre-determined dynamic range over an extended period of time. When, however, the gain of the laser is reduced to a level requiring a voltage from the power supply which is at or above a pre-determined value, gas from the gas sources A and B is injected and, if necessary, the chamber gas may be partially replaced with gas from the two sources. During the gas injection or replenishment operation, the gain of the laser is maintained by the power control system. Thus the gain is maintained constant throughout the entire operation of the laser, including the relatively infrequent periods of gas injection or replenishment. The gain is thus optimized and stabilized over the short term by using a feedback loop to control the excitation power and, over the long term by using the two-source gas injection and replenishment system to control the concentration of the halogen and the purity of the gas mixture in the chamber.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

Figure 1:
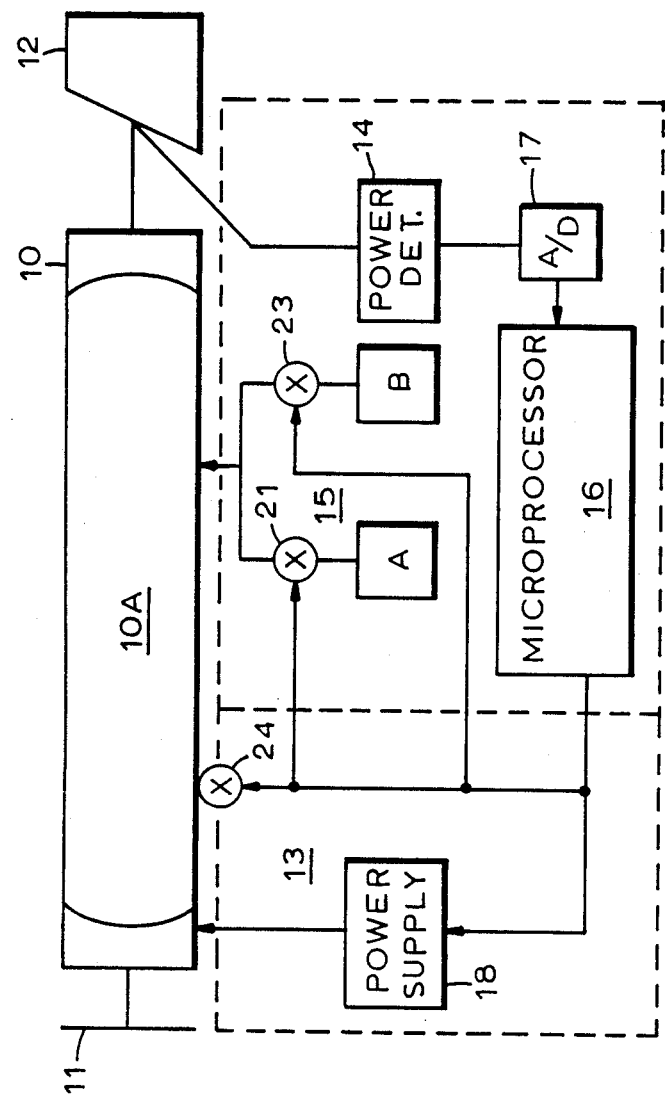
FIG. 1 is a functional block diagram of a laser unit constructed in accordance with the preferred embodiment.

FIG. 1 illustrates a laser 10, including a rear mirror 11, a front mirror 12, a discharge chamber 10A and a power supply 18 that provides electrical excitation to pump the laser 10, and two feedback control loops 13 and 15. The loop 13 controls the excitation power applied to the laser and the loop 15 controls the gas concentrations in the discharge chamber 10A. The control loop 13 includes a power detector 14 and a microprocessor 16 which continuously senses, through an A/D converter 17, the output of the power detector 14. The loop 15 includes the detector 14 and the microprocessor 16 and A/D converter 17, as well as two gas sources A and B with corresponding valves 21 and 23, and a valve 24 through which gas may be removed from the discharge chamber 10A. Gas source A contains a mixture of the buffer gas and the rare gas in the "optimum" concentrations, that is, concentrations which enable the laser to operate at a pre-determined gain. Gas source B contains a mixture of the buffer gas and the rare gas in the optimum concentrations and the halogen in a concentration which is greater than optimum.

To begin operation, the discharge chamber 10A is filled with gas from both gas sources such that the mixture in the chamber 10A contains buffer gas, rare gas and halogen in the optimum concentrations. If, for example, source B contains four times the optimum concentration of halogen, the chamber 10A is filled with three parts gas from source A and one part gas from source B.

As the laser 10 operates, the halogen reacts with other materials in the discharge chamber 10A and the halogen concentration is depleted. The effect of the halogen depletion, reduced gain, is reflected in the output of the power detector 14. In response, the microprocessor 16 turns up the power supply voltage, supplying increased excitation power and thus maintaining the gain at the desired level. The operation of this feedback loop continues until the power supply voltage is increased to a pre-determined voltage upper limit as discussed in reference to FIG. 2.

Figure 2:
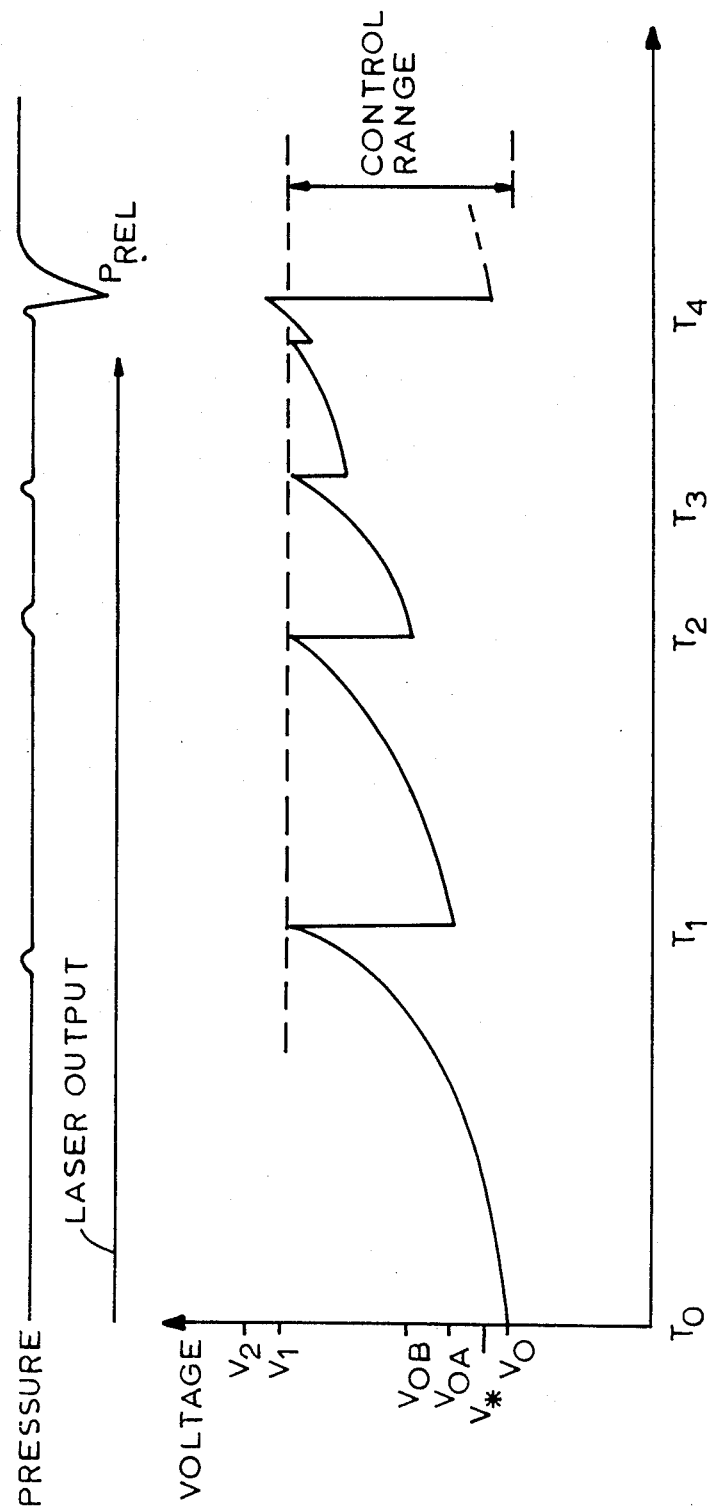
FIG. 2 is a graph of power supply voltage, discharge chamber pressure and laser output over time.

FIG. 2 illustrates the gradual increase in the power supply voltage, from an initial value of $V_o$ to the predetermined voltage limit $V_1$ as the halogen concentration is depleted over the operating time $T_0$ to $T_1$. When the voltage reaches the value $V_1$, the microprocessor 16 (FIG. 1) operates the valve 23 to inject the buffer gas, rare gas and halogen mixture from source B into the chamber to recharge it, and the chamber 10A once again contains close to the optimum concentrations of all the gases.

As fresh gas is injected into the chamber, the gain increases and the power supply voltage is correspondingly decreased by the microprocessor 16. When gas injection no longer results in a decrease in the power supply voltage, or sooner as determined by the microprocessor software, the microprocessor 16 closes the value 23 and opens the valve 24, allowing gas to be removed from the chamber 10A, to reduce the pressure in the chamber to its original value. The power supply 18 is then at a voltage $V_{0A}$, which may be slightly above the initial voltage $V_0$ due to the accumulation of contaminants in the chamber during the time period $T_0$ to $T_1$. The excitation power loop 13 then continues to control the excitation power, that is, the power supply voltage, to maintain the gain of the laser.

When the power supply voltage again reaches the predetermined voltage limit $V_1$, the microprocessor 16 (FIG. 1) opens valVe 23 and the gas from source B, containing halogen, is again injected into the chamber 10A until the injections fail to further reduce the power supply voltage or until a pre-determined voltage is reached. The valve 23 is then closed and the valve 24 opened to remove gas from the chamber to reduce the chamber pressure to its original value. At this point the chamber 10A contains the optimum concentration of halogen, and all of the other gases. The resulting power supply voltage $V_{0B}$ may be slightly above $V_{0A}$ due to the continued buildup of contaminants in the chamber 10A.

The gain is thereafter continuously controlled by using the two feedback loops 13 and 15 until, at time $T_4$ in FIG. 2, the desired gain cannot be maintained with a power supply voltage below $V_1$. This occurs because, for example, the discharge chamber 10A contains too many contaminants for a recharging injection from source B to restore the gain to the desired level. At this point, the microprocessor 16 opens a gas chamber valve 24 and releases a portion of the gas from the chamber 10A. The microprocessor 16 then closes the gas chamber valve 24 and opens valves 21 and 23 to replenish the chamber 10A with fresh gas from both gas sources A and B.

When the gas is released at time $T_4$, the pressure P in the chamber 10A sharply drops to a level $P_{REL}$. In order to compensate for the pressure drop and maintain the gain of the laser, the power supply voltage is increased above the level $V_1$ to a level $V_2$. Then as the fresh gas is injected into the chamber 10A, the chamber pressure P rises, and the power supply voltage decreases from $V_2$ to $V_*$, a voltage which may be close to $V_0$. When the power supply voltage drops to $V_*$, the microprocessor closes valves 21 and 23, and the gain of the laser is then once again controlled by the two feedback loops 13 and 15 as described above.

If too much halogen is injected at any time, the microprocessor 16 ascertains this fact and opens valve 21. The gas from source A is thus injected into the chamber 10A, reducing the halogen concentration to the proper level. If necessary, gas may be removed from the chamber either before or after injection from source A in order to maintain the optimum total chamber pressure. Thus the concentration of halogen is reduced by the gas injection, while the concentrations of the other gases are kept at optimum levels, and the gain is stabilized at the desired level.

Figure 3:
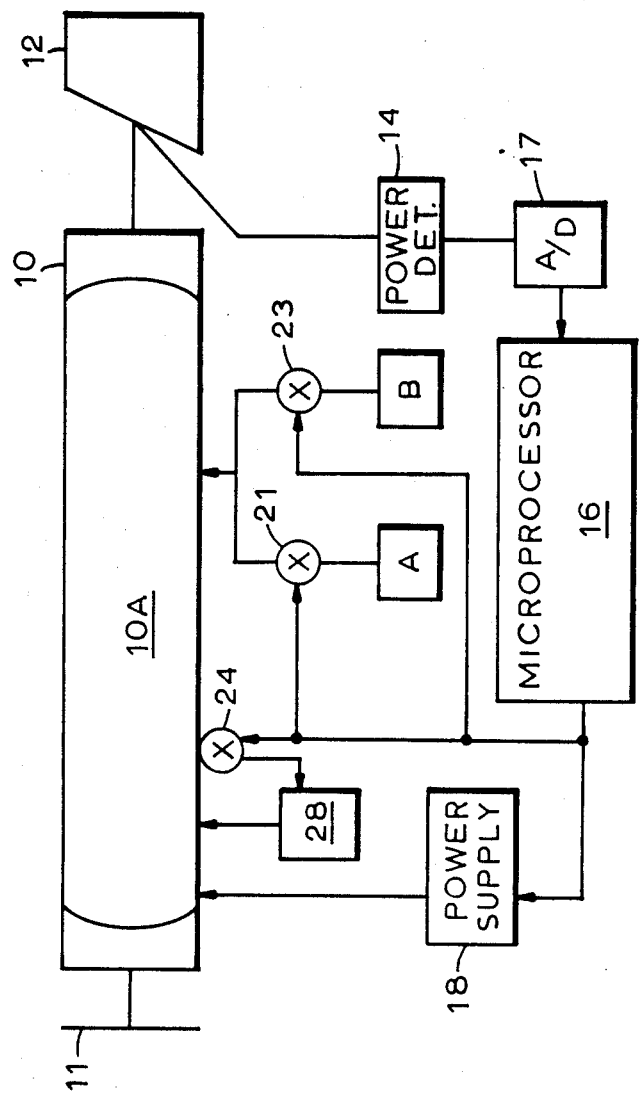
FIG. 3 is a functional block diagram of the laser unit shown in FIG. 1 with the addition of a gas recycler.

FIG. 3 is an illustration of the system shown in FIG. 1, with the addition of a gas recycler 28. The laser 10 operates as described above—except that when gas is released from the chamber 10A at, for example, time $T_5$ (FIG. 2), the gas, which consists of halogen, buffer gas, rare gas and contaminant is fed to the recycler 28. The recycler 28 removes the halogen and the contaminants, and the resulting mixture is buffer gas and rare gas in the same concentrations as the chamber gas, that is, in the optimum concentrations. This mixture can then be re-used in the chamber 10A either directly or by storing it in a container to be used later. Re-using the gas saves the cost of supplying additional rare gas and buffer gas, which may represent a significant savings.

The concentration of halogen in source B depends upon the particular gas used as the halogen, laser maintenance requirements and system experience. If the laser 10 is to be used in medical procedures, for example, the maintenance specification may require that both source A and source B are changed at the same time. Thus, the halogen concentration for gas source B is chosen so that equal fractions of both gas sources are consumed by the system over a given period of time. A different application of the laser 10 may require that the gas source containing halogen be changed relatively infrequently. Thus, the source B halogen concentration is chosen such that very little gas is required from that source.

The system described above, containing the two feedback loops 13 and 15 (FIG. 1), is a preferred embodiment. A system containing only the feedback loop 15, and thus controlling only the halogen concentration in the discharge chamber 10A, also operates to maintain a pre-determined gain. This system controls the injection of gas from the gas sources A and B, through the microprocessor 16, in response to the signal from the power detector 14 and A/D converter 17. This signal is indicative of the output power of the laser. When the output power begins to decrease, the microprocessor 16 opens valves 21 and/or 23 to inject gas into the discharge chamber 10A in proportions to maintain the pre-determined gain. It then closes the valves 21 and/or 23 and opens valve 24 to remove excess gas.

The foregoing description has been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An excimer laser unit comprising:
   A. a laser resonant cavity;
   B. a discharge chamber in said laser resonant cavity;
   C. a first gas source connected to supply gas to said discharge chamber, said first source containing a mixture of a buffer gas and a rare gas in concentrations to provide a predetermined laser gain at a predetermined level of excitation;
   D. a second gas source connected to supply gas to said discharge chamber, said second source containing a mixture of the buffer gas and the rare gas in concentrations to provide said predetermined laser gain and a halogen in a concentration greater than that required to provide said predetermined laser gain at said predetermined level of excitation;
   E. an electrical power supply connected to supply excitation energy to said discharge chamber, the laser unit producing in response to said excitation energy an associated output signal;
   F. power detecting means responsive to said laser unit output signal, said power detecting means providing a signal which is indicative of the output power of the laser unit and related to the gain of said laser unit;
   G. pressure measuring means for measuring the pressure in said discharge chamber;
   H. control means responsive to the output signals of said power detecting means, said electrical power supply and the pressure measurements of said pressure measuring means for:
      1. controlling the output of said power supply within a control range to maintain the predetermined laser gain, said control means increasing said output if the gain of the laser drops below a predetermined level and decreasing said output if the gain of the laser increases above a predetermined level,
      2. when the power supply output signal is increased to a predetermined maximum level within said control range, controlling the supply of gas to said discharge chamber from said first gas source and said second gas source such that the concentrations of buffer gas, rare gas and halogen in the gas mixture in said discharge chamber provide a predetermined gain when excited by a power supply output within said control range, and
      3. controlling the pressure in said discharge chamber by removing gas from said chamber until said pressure measuring means indicates that the pressure in said chamber is reduced to a predetermined level,
      4. said control means controlling the output of said power supply to maintain the gain of the laser at the predetermined level until the power supply output signal reaches said maximum level, said control means then controlling the supply of gas to said discharge chamber such that the laser unit produces an associated output signal with said predetermined gain while the power supply is operating within the control range.

2. The excimer laser unit of claim 1 wherein said control means further controls the concentration of buffer gas, rare gas and halogen in the gas mixture in said discharge chamber by:
   A. A releasing a portion of the gas mixture from said discharge chamber which also releases contaminants that have built up in the gas mixture, when the excitation energy supplied by said electrical power supply has risen to said maximum level, and
   B. replenishing the gas supply in said discharge chamber with gas from said first gas source and said second gas source in proportions that provide to said chamber a mixture of gasses with concentrations which said power supply can excite with a level of excitation energy that is lower than said maximum level and within said control range.

3. The excimer laser unit of claim 2 further comprising a gas recycler connected to receive gas released from said discharge chamber for recylcing the released gas by removing the contaminants from the gas and resupplying it to said first gas source.

4. A method of maintaining a predetermined gain of an excimer laser unit, said method comprising the steps of:
   A. providing a signal corresponding to the output power of the laser unit and related to the gain of the laser unit;
   B. supplying excitation energy, at levels within a predetermined control range, to a discharge chamber contained in the laser unit;
   C. in response to the level of said signal corresponding to the output power, controlling the level of said excitation energy within said control range to maintain the predetermined laser gain;
   D. when the level of excitation energy reaches a predetermined level, providing to said discharge chamber gas from a first gas source containing a mixture of (i) a buffer gas and a rare gas in concentrations which provide a predetermined laser gain when a predetermined level of excitation energy is supplied, and (ii) a halogen in a concentration which is greater than that required to provide the predetermined laser gain, said gas being provided such that the concentrations of buffer gas, rare gas and halogen in the gas mixture in said discharge chamber, when excited with a lower level of excitation energy than said predetermined level, produce a signal which is associated with a predetermined gain, and
   E. repeating steps C and D to maintain the gain of said laser at a predetermined level.

5. The method of maintaining the gain of a laser of claim 4, said method further comprising the steps of:
   A. controlling the concentration of buffer gas, rare gas and halogen in the gas mixture in said discharge chamber by releasing a portion of the gas mixture from said discharge chamber, thereby also releasing contaminants that have built up in the gas mixture, when (i) the excitation energy supplied to said discharge chamber has risen to said predetermined level, and (ii) the delivery of gas from said first gas source does not reduce said excitation energy below a second predetermined level; and
   B. replenishing the gas supply in said discharge chamber with gas from said first gas source and gas from a second gas source which contains a mixture of the buffer gas and the rare gas in concentrations to provide a predetermined gain when excitation energy within said control range is applied to said chamber, the gasses from said first gas source and said second gas source being supplied in proportions which provide in said discharge chamber concentrations of the gasses which, when excited with a level of excitation energy that is lower than said second predetermined level, product a signal which is associated with a predetermined gain.

6. The method of claim 5 further comprising recycling the gas released from said discharge chamber by:
   A. removing the contaminants; and
   B. supplying the recycled gas to said first gas source.

7. An excimer laser unit comprising:
   A. a laser resonant cavity;
   B. a discharge chamber contained in said laser resonant cavity;
   C. a first gas source connected to supply gas to said discharge chamber and containing a mixture of a buffer gas and a rare gas in concentrations to provide a predetermined laser gain when excitation energy within a control range is supplied to said discharge chamber;
   D. a second gas source connected to supply gas to said discharge chamber and containing a mixture of the buffer gas and the rare gas in concentrations which provide the predetermined laser gain when excitation energy within said control range is supplied to said discharge chamber and a halogen in a concentration which is greater than that required to provide the predetermined laser gain;
   E. control means for
      1. delivering gas to said discharge chamber from said second gas source to maintain the concentrations of buffer gas, rare gas and halogen in the gas mixture in said discharge chamber at levels which, when excited with excitation energy within said control range produce a signal which is associated with a predetermined gain;
      2. releasing a portion of the gas mixture from said discharge member, thereby also releasing contaminants that have built up in the gas mixture, and
      3. replenishing the gas supply in said discharge chamber with gas from said first gas source and said second gas source in proportions which, when excited with excitation energy at a level within said control range, produces a signal which is associated with the predetermined gain.

8. The excimer laser unit of claim 7, said laser unit further comprising a gas recycler connected to receive gas released from said discharge chamber, for recycling the released gas by removing the contaminants from the gas and supplying it to said first gas source.

9. A method of operating at a predetermined gain, an excimer laser unit which includes a discharge chamber and two gas sources the method comprising the steps of:
   A. supplying gas to the discharge chamber from said first gas source, which contains (i) a mixture of a buffer gas and a rare gas in concentrations which provide the predetermined laser gain when excited by excitation energy within a control range and (ii) a halogen in a concentration greater than that required to provide the predetermined laser gain;
   B. releasing a portion of the gas mixture from the discharge chamber, thereby also releasing contaminants that have built up in the gas mixture; and
   C. replenishing the gas supply in the discharge chamber with gas from said first gas source and gas from a second gas source, which contains a mixture of the buffer gas and the rare gas in concentrations to provide the predetermined laser gain when excited by excitation energy within the control range, said replenishing providing gas to said chamber in proportions which produce when excited by excitation energy within the control range a signal associated with the predetermined laser gain.

10. The method of claim 9 further comprising recycling the gas released from said discharge chamber by:
    A. removing the contaminants; and
    B. resupplying the gas to the second gas source.

* * * * *